United States Patent [19]

Gadol

[11] Patent Number: 5,754,857

[45] Date of Patent: May 19, 1998

[54] DISTRIBUTED ASYNCHRONOUS WORKFLOW ON THE NET

[75] Inventor: Steven D. Gadol, Portola Valley, Calif.

[73] Assignee: Sun Microsystems, Inc., Mountain View, Calif.

[21] Appl. No.: 569,801

[22] Filed: Dec. 8, 1995

[51] Int. Cl.$^6$ .............................. G06F 9/44; G06F 15/16
[52] U.S. Cl. .................................. 395/680; 364/DIG. 1; 364/DIG. 2; 395/684
[58] Field of Search ........................... 395/200.1, 200.01, 395/200.15, 200.16, 800, 200.14, 562, 831, 569, 200.09, 678, 182.14, 183.14, 200.33, 280.61, 200.77, 684, 680, 228, 207, 357; 364/DIG. 1, DIG. 2, 401 R; 370/389, 466

[56] References Cited

U.S. PATENT DOCUMENTS

| | | | |
|---|---|---|---|
| 5,086,386 | 2/1992 | Islam | 395/182.14 |
| 5,481,719 | 1/1996 | Ackerman et al. | 395/562 |
| 5,600,789 | 2/1997 | Parker et al. | 395/183.14 |

OTHER PUBLICATIONS

"The Java Language Specification", Release 1.0 Alpha3, May 11, 1995, Sun Microsystems Computer Corporation.

"Java and Internet Programming", Dr. Dobb's Journal, Aug. 1995, pp. 55–61 and 101–102.

"The Coming Software Shift Telecosm", by George Gilder, Aug. 28, 1995, pp. 147–162.

"The Internet becomes multimedia–savvy: Macromedia, Sun nab Netscape Navigator", by Jason Snell, MacUser, Sep. 1995, vol. 11, No. 9, p. 31(1).

"OSF Opens Software Web Mall For Java", Newsbytes, Jul. 26, 1995.

"Complex Browsers Seek to Expand Role", (World Wide Web browsers), by Scott R. Raynovich, LAN Times, Jul. 3, 1995, vol. 12, No. 13, p. 1(2).

"Sun, Netscape to wake up Web users", (Sun Microsystems license its Java World Wide Web development language to Netscape Communications Corp), Scott R. Raynovich, LAN Times, Jun. 19, 1995, vol. 12, No. 12, p. 44(1).

"Internet access: Sun unveils most complete set of Internet business solutions available today; Internet pioneer delivers on challenge of electronic commerce", EDGE: Work–Group Computing Report, May 29, 1995, vol. 6, No. 262.

"Sun takes new shape" (Sun Microsystems strategy for its UltraSPARC microprocessor), by Jim DeTar, Electronic News (1991), May 29, 1995, vol. 41 No. 2067, p. 1(2).

(List continued on next page.)

*Primary Examiner*—Daniel H. Pan
*Attorney, Agent, or Firm*—Douglas J. Crisman; Flehr Hohbach Test Albritton & Herbert LLP

[57] ABSTRACT

A system and method for automating workflow by distributing the tasks required for the execution of said workflow over servers and clients connected on a network. The disclosed system and method allow the stages of the workflow to be performed asynchronously, meaning that, once a workflow initiated by a user has been initiated by a database server, the stages of the workflow can be executed on respective network clients without further interaction with the server (i.e., without requiring a stateful connection between the clients and servers). This is accomplished through the use of a workflow courier that embodies all programs (encompassing rules governing the execution of the workflow) and forms needed by clients to complete stages of the workflow. The workflow courier also stores workflow state information that indicates which stages of the workflow have been completed. The executable programs are written in the platform-independent Java programming language and are therefore executable on any computer that has an installed Java browser. After each stage is executed, the client executing that stage updates the workflow courier and transmits the updated workflow courier to a client having an associated user who is authorized to perform the next step in the workflow. The updated state information indicates to the recipient of the workflow which stages remain to be completed.

42 Claims, 7 Drawing Sheets

OTHER PUBLICATIONS

"HotJava could become a lot hotter than just a Web browser for animations" (Sun Microsystems HotJava Web browser) (Distributed Thinking), by Stewart Alsop, InfoWorld, May 29, 1995, vol. 17, No. 22, p. 94(1).

"Sun Microsystems Bringing Interactive Technology to the WWW", by Michael Goulde, Open Information Systems, Mar. 1995, vol. 10, No. 3, p. 29(3).

"Hi-resolution" (New Year's resolutions), by Gil Schwartz, PC-Computing, Jan. 1995, vol. 8, No. 1, p. 77(1).

"The Common Object Request Broker: Architecture and Specification", (COBRA V2.0) Revision 2.0, Jul. 1995.

"A Spring Collection", (A Collection of Papers on the Spring Distributed Object-Oriented Operating System), SunSoft, Sep. 1994.

"The Java Language Environment", by James Gosling and Henry McGilton, May 1995, pp. i–65.

"Telescript Language," Web Page WWW.genmagic.com.

"JetForm Server," by JetForm Corporation (1994) four page brochure.

"The DIANA Approach to Mobile Computing," by Tahir Ahmad, et al., 14 pages.

"Symantec Announces FormFlow 2.0—A Revolutionary Shift in the Power and Capabilities of Electronic Forms Technology," by Symantec Corporation (Feb. 1996) 7 pages. Web page WWW.delrina.com.

(Conventional Model)

DISTRIBUTED ASYNCHRONOUS WORKFLOW ON THE NET

The present invention relates generally to computer networks and, particularly, to methods and systems for performing a sequential process, or workflow, on distributed nodes of a network without requiring the network nodes to have prior knowledge of the sequential process being performed or to share a stateful connection.

BACKGROUND OF THE INVENTION

In business settings, many projects or tasks are performed in stages, where each stage of the task is performed by a different person and where the stages are performed in an order that is dictated by a set of business rules. These kinds of tasks are called a workflow. One such workflow is the corporate travel request/reimbursement process where, prior to taking a business trip, an employee might be required to submit a travel request to his manager for approval. Once approval is granted, a corporate travel department could then be asked to make appropriate travel arrangements, after which the employee is free to make the trip. After returning from the trip, in order to be reimbursed for his travel expenses the employee might need to complete and submit for his manager's approval a travel expense report. If the manager approves the expense report, it will be typically relayed to an appropriate person in the accounting department, who will authorize payment to the employee of the approved amount. If the manager rejects the expense report (perhaps the employee omitted a required signature or requested reimbursement for unauthorized expenses), the report might be bounced back to the employee for correction, then resubmitted to the manager. Thus, in this workflow, and in many others, there is typically some flexibility in the ordering of the workflow stages.

Note also that there is likely to be some flexibility in the actors who are authorized by the rules to perform each of the stages. For example, in the travel expense case, corporate rules might allow the employee's manager to approve for reimbursement expenses below one thousand dollars, but those same rules might require approval by the manager and the manager's manager for larger amounts. These workflow traits suggest a need for dynamic routing among workflow actors in systems that automate workflows.

Traditionally, workflow has been automated using architectures similar to the one shown in FIG. 1. In this type of automated workflow system, an individual (e.g., the traveling employee) uses a client workstation with some stateful connection to a server to initiate a workflow request. In response, the server initiates a workflow application, which causes the server to return a form (e.g., the travel request document) to the client for the requester to fill out. Once the requestor has completed the form, he sends it back to the server, which, under control of the same workflow application, stores in a database the information entered by the requester. The workflow application then uses the information in the database to send the same form or a related form (e.g., a travel approval form) to an actor (e.g., the traveling employee's manager) who is authorized to perform the next stage of the workflow. The workflow application might consult an organizational database to identify the manager of the requester. Once the authorized actor completes the next stage (e.g., approves the travel request), the form is returned to the server, where the workflow application updates the database and carries out additional transmissions (actions) to complete the remaining stages of the workflow. For example, after receiving the completed travel approval form, the workflow application might forward both forms to the corporate travel office to make travel arrangements. Automated workflow processes also typically check for required items such as employee signatures and travel expenditure amounts.

This type of traditional automated workflow system requires that compatible versions of all required software be pre-installed on the network nodes of all persons who might perform some stage of the workflow. These prior art systems also require that forms, code, business rules governing the execution of the workflow and storage of workflow data all be tightly coordinated. This is because all of the intelligence in such systems resides in the coordinated applications running on the network nodes and not in the forms transferred across the network, which are mere data containers. For example, if the server sent the requester a form in a format which could not be read or processed by any software on the requestor's client, the requester could not fill out the form and the workflow could not be completed. Consequently, if either the workflow application running on the server or the related programs that run on the employee's or manager's client workstations that allow a user to interact with the forms sent by the server are updated or modified, coordinated software updates must be performed across the entire system. This requirement for coordinated updates means that automated systems of this type must be strongly centralized around a primary database server with stateful network connections to client nodes. Of course, the strongly centralized nature of this type of automated workflow system means that network bandwidth and computing resources are not efficiently utilized. Even more important, when such automated workflow systems are implemented on large networks, the cost of coordinating the many network nodes on which stages of the workflow are performed can become prohibitively large. This is because such large networks have many more failure modes than a single mainframe or server controlling dumb terminals or clients, which is the environment for which the prior automated workflow models were conceived.

Consequently, there is a need for an improved workflow automation system that does not require pre-installation of all software required to execute a workflow on the network nodes of all possible actors in that workflow. There is also a need for a workflow automation system that is not strongly centralized (i.e., more flexible, less complex, lower cost of operation than the prior art) and therefore makes efficient use of network bandwidth and computing resources. Finally, there is a need for a workflow automation system that does not require stateful connections between a single database server and the network nodes of actors who perform stages of the workflow.

SUMMARY OF THE INVENTION

In summary, the present invention is an improved workflow automation system that does not require pre-installation of all software required to execute a workflow on the network nodes of all possible actors in that workflow. The present invention also enables workflow automation tasks to be distributed across the network nodes, rather than being centralized in a server, which makes efficient use of network bandwidth and computing resources. Finally, the workflow automation system of the present invention does not require stateful connections between a single database server and the network nodes of actors who perform stages of the workflow.

More particularly, the present invention is a distributed system for asynchronously executing steps of a sequential process on a network that includes at least one server and at least one client coupled to the network, wherein the servers and the clients each include a processor and a memory and have a unique network ID. This distributed system includes a requester program that is executable on a client's processor, and a provider program that is executable on a server's processor and a workflow courier which is passed from the provider to the requester.

The requester is configured to control messages issued by the client on the network, one of which is a document request message instructing a particular one of the servers to transmit to the client a workflow courier requested by a user of the client. The provider, which is configured to be responsive to the messages directed to the server, responds to the provider's document request message by causing the server to transmit to the client the workflow courier. This workflow courier includes a set of forms to be completed through the execution of a plurality of stages that compose a workflow, each of the stages being executable by a respective actor. For the purposes of the present application, the term "forms" means any manifestation of a set of actions to be completed through the execution of the workflow, including conventional forms. The workflow courier also includes state data indicating executed stages in the workflow and a registry containing at least one code fragment reference, each of which points to an executable code fragment.

Upon receiving the workflow courier document over the network, the requestor displays one of the forms and, based on user interaction with that form and other displayed forms, selectably loads and runs a set of referenced code fragments that are configured, when running, to perform a number of workflow tasks. For example, possible workflow tasks include displaying the forms, determining from the state data a pending stage to be executed, guiding an actor through execution of the pending stage based on workflow rules, updating the forms and the state data in the workflow courier document to reflect completion of the pending stage and forwarding the updated workflow courier document to an appropriate network node for execution of a subsequent stage by another actor.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

System Architecture

Figure 2:
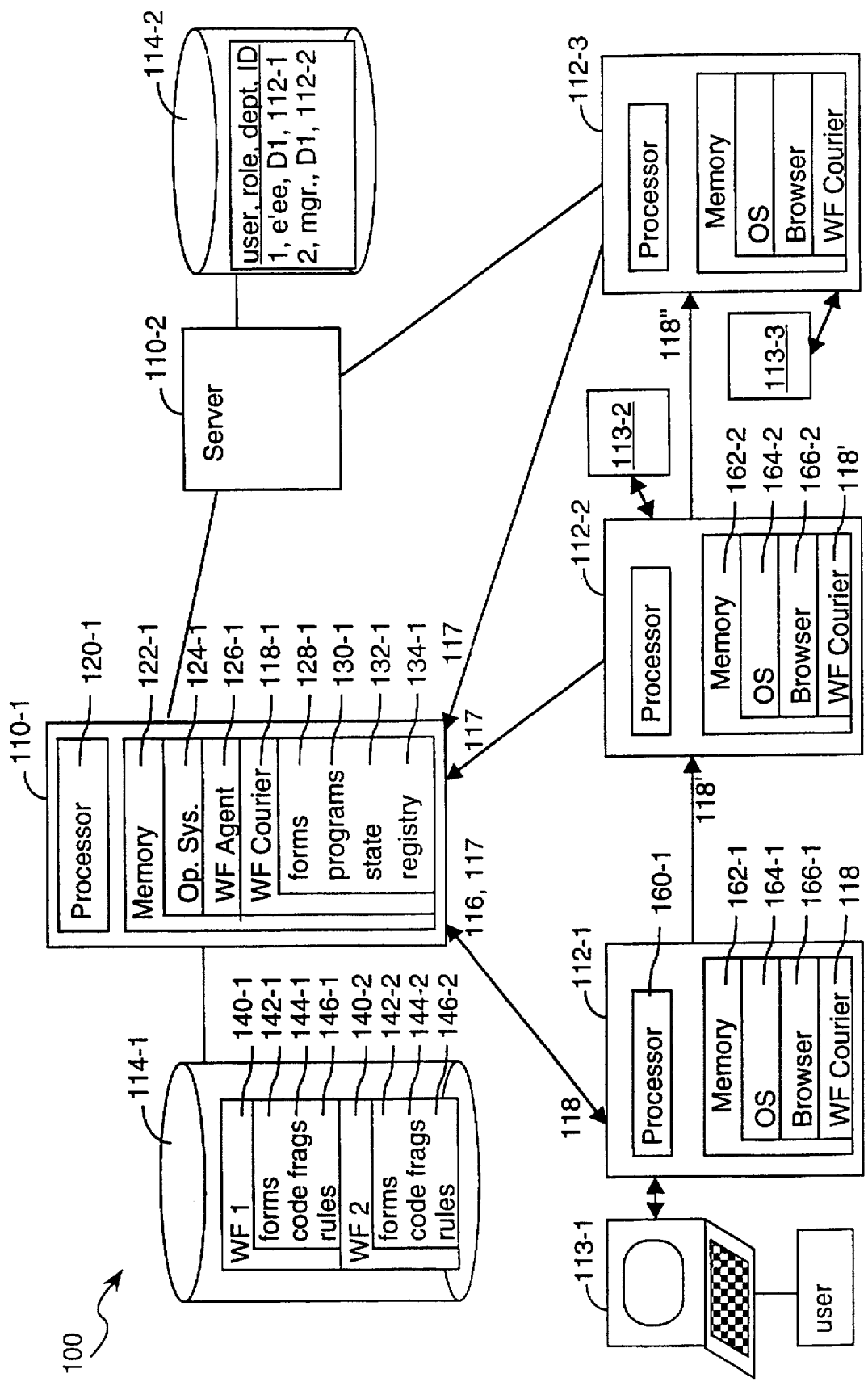
FIG. 2 is a diagram illustrating a preferred embodiment of an asynchronous distributed system for workflow as taught by the present invention.

Referring to FIG. 2, there is shown is a diagram illustrating a preferred embodiment 100 of an asynchronous distributed system for workflow as taught by the present invention.

The preferred embodiment includes a network of servers 110-1, 110-2 and clients 112-1, 112-2, 112-3, each with a unique network address. At least one of the servers 110-1 is coupled to a workflow database 114-1, to which the server 110-1 can issue database queries. Another server 110-2 could be coupled to a user directory 114-2, which is a database that lists the node addresses of clients 112 associated with known network users. Generally, these users interact with their associated client 112 through a display/input device 113. There is no requirement for commonality (of hardware or operating systems) among the servers 110 and clients 112 except that, as network nodes, they must be capable of communicating over the network linking them. For the purposes of the present invention, "communicating" means any exchange of data with meaning to a computer, including e-mail, transfers over persistent network connections, dial-up access, or even sneaker-net transfers using floppy disks. As the network in the preferred embodiment is the Internet, the servers 110 and clients 112 communicate using Internet protocols, such as TCP/IP or HTTP (hypertext transfer protocol), RPC (remote procedure calls) or SMTP (simple mail transport protocol). In addition to being suited for use with the Internet, the present invention can be employed with other types of networks, such as departmental local area networks (LANs) or corporate wide area networks (WANs).

The workflow database 114-1 represents the forms 142 and rules 146 associated with each workflow (WF) 140-1, 140-2 that can be initiated by a user. Possible rules 146 include (1) what actor type must approve what requests (for the purposes of this document, the term "actor type" also encompasses other actor selection criteria), (2) the formatting of data fields in the forms 142, (3) what data fields must be completed before a stage is considered complete and (4) meta-rules that describe the workflow at a high level. The workflow database 114-1 also includes code fragments 144 that, when executed on a client 112, assist the clients' user to complete a stage or stages of a particular workflow 140. For example, a code fragment 144 might be a handler for a form 142 written in a format that could not, without the handler, be displayed or manipulated by the clients 112. In the preferred embodiment, the code fragments 144 are executables written in a platform-independent computer language, such as Java.

Important features of the Java programming language include the architecture-independence of programs written in the Java language, meaning that they can be executed on any computer platform having a Java interpreter, and the verifiability of the integrity of such programs, meaning that the integrity of Java programs can be verified prior to their execution. A Java program verifier determines whether the program conforms to predefined stack usage and data usage restrictions that ensure that verified programs cannot overflow or underflow the executing computer's operand stack and that all program instructions utilize only data of know data types. As a result, Java language programs cannot create object pointers and generally cannot access system resources other than those resources which the user explicitly grants it permission to use. Consequently, when one or more of the code fragments 144 are downloaded to a client 112 along with an associated form 142, a Java-compatible browser 166 running on the client 112 will be able to verify and execute the downloaded code fragments 144 and display and assist the user in filling out the associated forms. Of course, the present invention could also be implemented in a platform-specific manner in which each of the clients 112 has a known configuration and the programs are designed to run on these clients. However, such an implementation would result in a significant loss of flexibility. Another useful feature of Java is that Java applications can be dynamically downloaded and installed on the client system.

The servers 110-1, 110-2 include a processor 120 and a memory 122, which could be a fast memory, such as a random access memory (RAM), a slower secondary memory, such as a hard disk, or both. Stored in each memory 122 is an operating system 124 that runs on the processor 110, a workflow courier 118 and a workflow agent 126. The workflow courier 118 is structured similarly to an HTML (HyperText Markup Language) document and embodies all forms 128, state information 132, programs 130 and program references 134 needed by the clients 112 to perform a stage or stages of a requested workflow. The workflow courier 118 is formed dynamically by the workflow agent 126 in response to a workflow request 116 issued by one of the clients 112. The workflow agent 126 builds the workflow courier 118 using information contained in the workflow database 114-1 that pertains to the requested workflow and, optionally, specific information on the requesting user that is included with the request 116.

For example, if a user of the client 112-1 were to issue a travel request workflow message 116 and, assuming that the workflow database entry 140-1 is associated with the travel request workflow, the workflow agent 126-1 would build the workflow courier 118 from the forms 142-1, code fragments 144-1 and rules 146-1. The workflow agent 126-1 might also make use of known information such as the requestor's network ID, department and the time and data of the request to fill-in some of the fields of the forms 142-1. This user information might be found in the message 116 from the requestor or in the user directory 114-2. In building the workflow courier 118, the workflow agent 126 encapsulates the code fragments 144-1 and rules 146-1 into Java programs 130-1, which can be thought of as universally-executable expert systems encompassing knowledge about displaying and filling in the forms 128-1, and completing stages of the workflow 140-1. The forms 128-1 are created by the workflow agent 126-1 as copies of the forms 142-1, except that, where a hyperlink associated with a field of a form 142-1 references an absolute address (e.g., the URL, or universal resource locator) of the code fragment(s) associated with that field, the workflow agent 126-1 resets that hyperlink to the local address of an entry in the registry 134-1 that contains the absolute address of the corresponding program 130-1. More will be said below about the registry 134-1; however, note that the registry 134-1 stores the addresses, or names, of the programs 130-1 that are embedded within the workflow courier 118-1 or stored in the memory 122 of another network node. Access to the entries of the registry 134-1 are obtained through local pointers, which, through binding with individual registry entries, are resolved to meaningful network names (e.g., actual program URLs) that are then used to retrieve the referenced programs. As for the accumulated state 132-1, this is a data structure whose entries store information about completed stages in the workflow. It is initially empty when created by the workflow agent 126-1.

In the preferred embodiment, each of the clients 112 includes a processor 160 and a memory 162 (a fast primary memory, a slower secondary memory, or both) on which an operating system 164, browser 166 and the downloaded workflow courier 118 are stored. The browser 166 is a program that is configured to display the downloaded workflow courier 118 in a way that allows users to interact with the forms 128 that partially compose the workflow represented by the workflow courier 118. The browser 166 is also capable of downloading and executing the programs 130 that are referenced or embedded in the downloaded workflow courier 118. As mentioned above, in the preferred embodiment the programs 130 are written in Java, thus the browser 166 is a Web browser, such as HotJava. Finally, at least some of the clients 112 are coupled to respective display/input devices 113, which allow a user or users to interact with the workflow courier 118 once it has been downloaded from the server 110.

Figure 3:
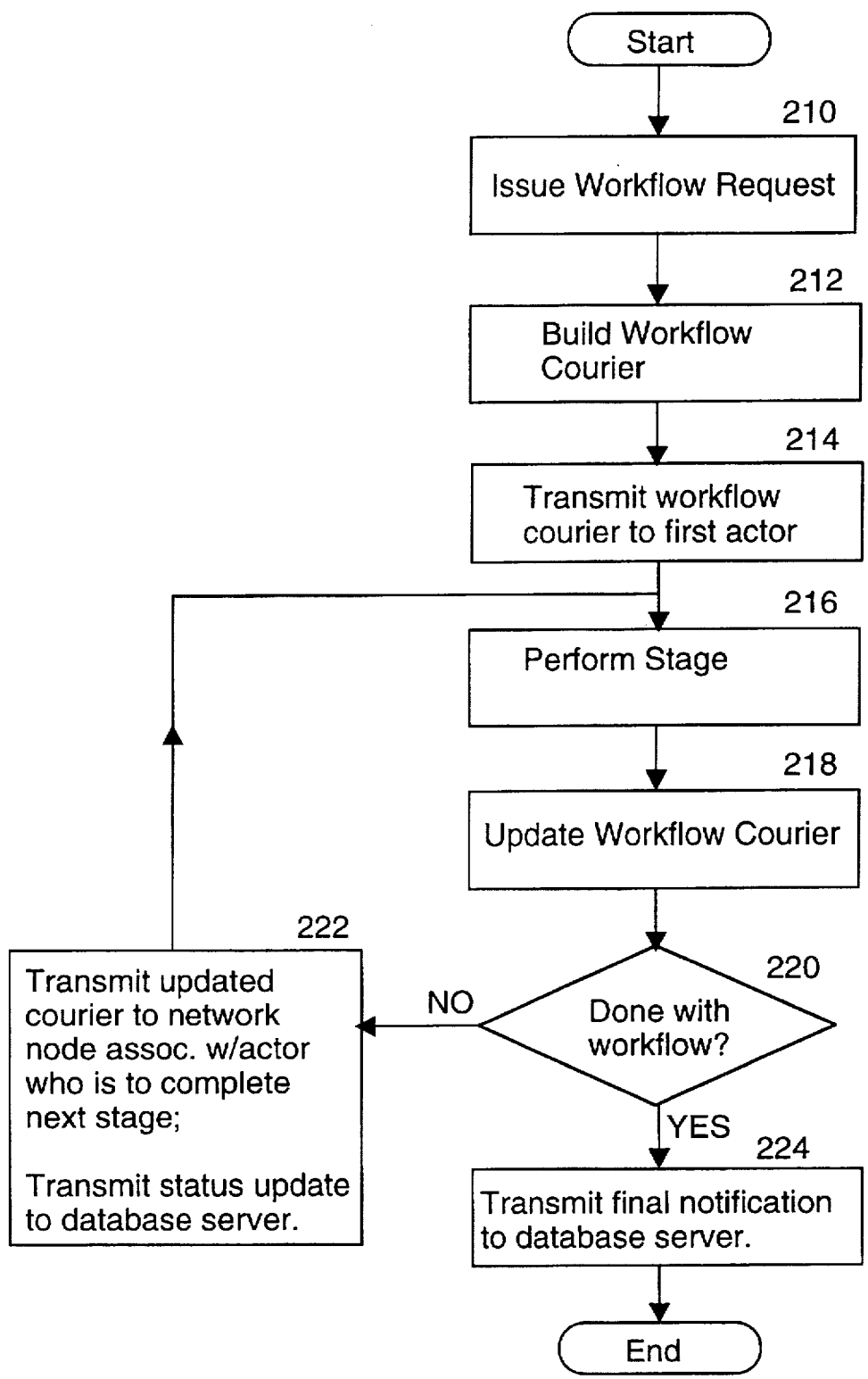
FIG. 3 is a flow chart illustration the steps by which the present invention asynchronously executes the stages of a workflow over a network.

Referring to FIG. 3, there is shown a flowchart illustrating how the workflow courier 118 enables the distributed, asynchronous execution of a workflow in a network environment. In the preferred embodiment, a user of a client 112-1 initiates a workflow by issuing a workflow request 116 to a server 110-1 that is responsible for the execution of the workflow (210). This workflow request 116 could be explicitly entered by the user from the input device 113-1 or selected from a list of workflow options presented by the client 112-1 on the display 113-1. For example, in the travel request example from above, the workflow request 116 might be the HTTP equivalent of "client 112-1 requests initiation of travel workflow by the server 110-1."

Upon receiving this workflow request 116, the workflow agent 126-1 running on the server 110-1 builds the workflow courier 118-1, which, as mentioned above, embodies the forms 128-1, state information 132-1, programs 130-1, and a registry 134-1 needed by the clients to perform the stages of the workflow initiated by the user 111-1 (212). The workflow agent 126 obtains this information from the workflow database 114-1, which represents, for multiple workflows 140, the relevant forms 142, underlying rules 146 (e.g., who must approve what requests, the format of data fields in the forms, what data fields must be competed and meta-rules that describe the flow at a high level), and code fragments 144 that, when executed on a client 112, assist the actor using the receiving client 112 to complete a workflow stage.

Figure 1:
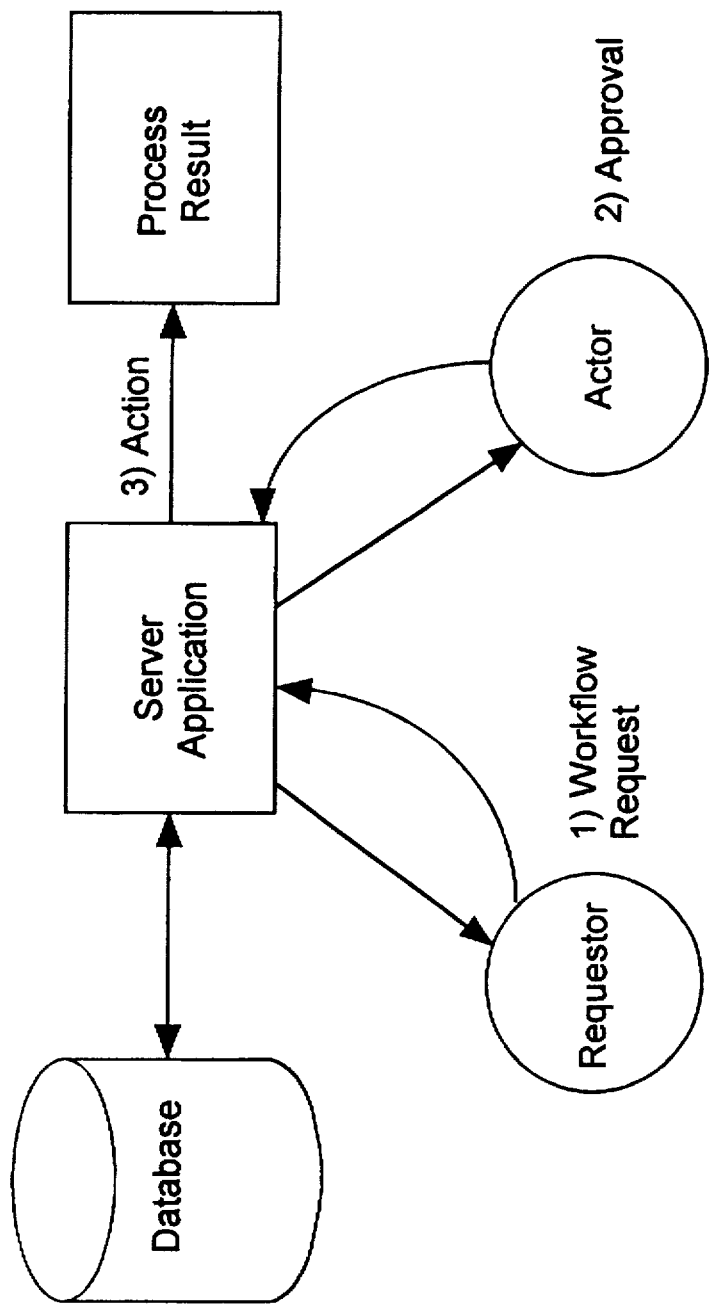
FIG. 1 is a diagram illustrating the architecture of prior art workflow processing environments.

Once it has built the workflow courier 118-1, the workflow agent 126-1 transmits (i.e., using e-mail, RPC, HTTP, etc.,) the workflow courier 118-1 to a client 112-1 having an associated user who is the actor authorized to perform the first stage of the workflow (this actor is typically the requestor) (214). The actor then performs the first stage by filling in appropriate fields of the forms 128-1 under control of the programs 130-1, which are executed by the client 112-1 while the first stage is being performed (216). For the purposes of this document, the actions performed in step (216) shall be referred to by the term "executing the workflow courier." After the user completes the first stage, the courier 118 updates itself (218) (i.e., the forms and state information) and then determines whether the workflow has been completed (220). If the workflow has not been completed (220-NO), the workflow courier 118-1 transmits itself as the updated workflow courier 118-1' (FIG. 1) to the client of the actor who is authorized to perform the next stage of the workflow and optionally sends a status update 117 (FIG. 1) to the database server (222). Once the workflow courier 118-1' is received by the next client, the same steps (216–222) are repeated until the last stage of the workflow is executed (220-YES), at which point the completed workflow courier 118 takes any final actions, including transmitting final notification to the database server 110-1 that kicked-off the workflow (224). The completed forms 128 could also be transmitted back to the server 110-1, retained at the last actor's client 110 or transmitted to some other data repository.

Having described the basic components of the preferred embodiment and the method of the present invention, the components of the workflow courier 118 are now described in greater detail.

Workflow Courier

Figure 4:
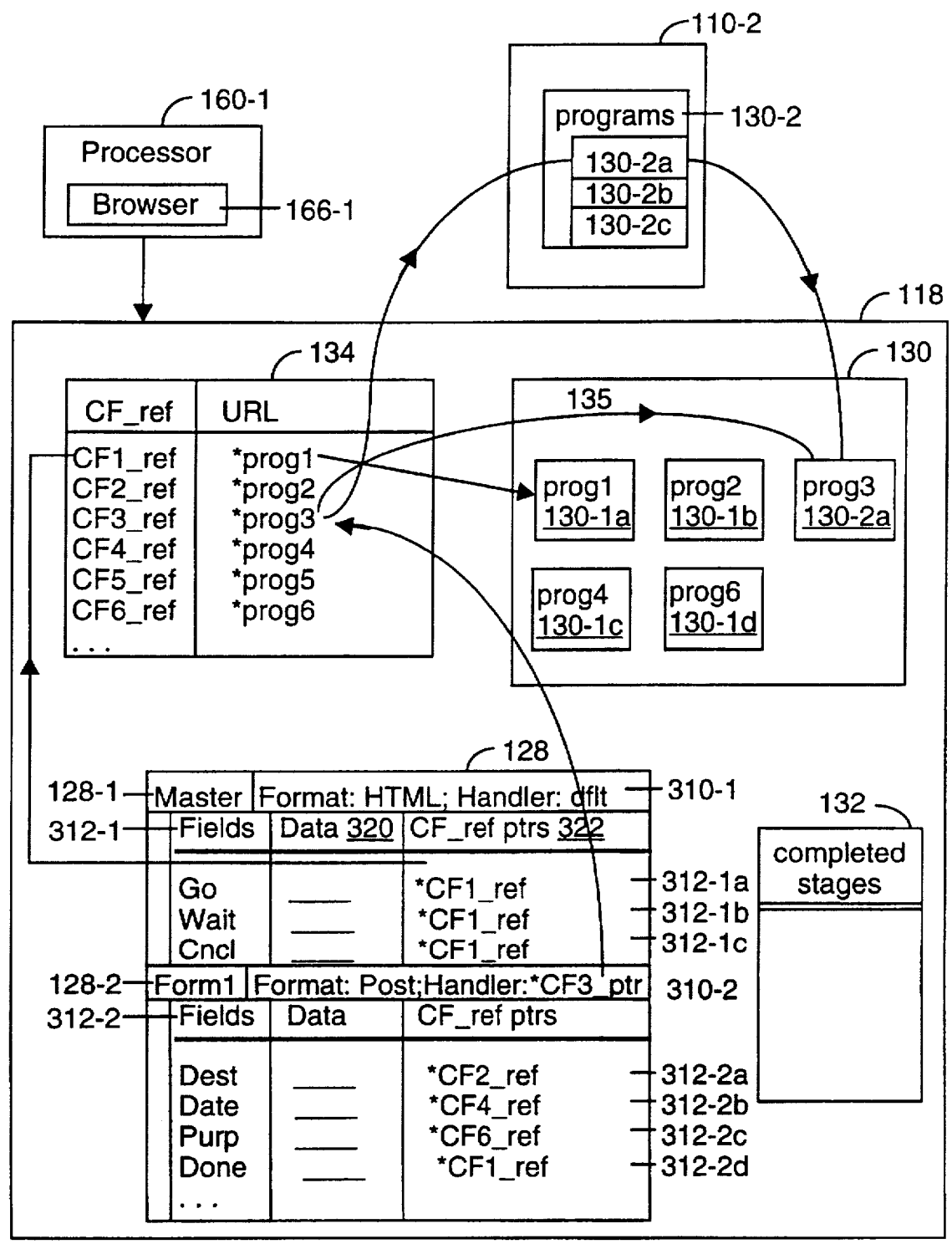
FIG. 4 is a data structure-oriented diagram of the workflow courier of the present invention.

Referring to FIG. 4, there is shown a data-structure oriented view of the workflow courier document 118 of the present invention. As mentioned above in reference to FIGS. 2 and 3, a workflow courier document 118 is assembled by a server 110 in its primary or secondary memory 122 in response to a workflow request 116 issued from a client 112 by a user of that client 112. A copy of the workflow courier 118 is downloaded to the memory 162 of a first client (e.g., the client 112-1 (FIG. 1)) that is to complete the first stage of the workflow. The copy of the workflow courier 118 is then updated and stored (as updated workflow couriers 118' and 118" (FIG. 1)) in the memories of other clients 112 (112-2 and 112-3, respectively (FIG. 1)) as the stages of the workflow are completed. As shown in FIG. 4, each workflow courier 118 includes a plurality of data structures, including forms 128, programs 130, accumulated state information 132, and a registry 134. Note that FIG. 4 shows the workflow courier 118 after it has been downloaded to the memory 162-1 of the client 112-1 and before any actions have been taken by the first actor. The information in the data structures of FIG. 4 represent hypothetical values drawn from the requested workflow 140-1 (i.e., the travel request workflow) discussed above.

The forms data structure 128 represents the form or forms that must be filled out in the course of the requested workflow 140-1. In the preferred embodiment, each form 128-i in the forms data structure 128 includes header information 310-i and fields 312-ij (where i and j represent different indices) that correspond to the fields that must be filled-in for the workflow to be completed. In FIG. 4, the forms data structure 128 includes two forms 128-1 and 128-2, each of which has multiple fields, 312-1a, 312-1b, 312-1c and 312-2a, 312-2b, 312-2c, 312-2d, respectively.

The header 310-i defines the overall format in which a form 128-i is represented (e.g., whether the form is represented as an HTML document, a proprietary format such as Delrina Forms, or a Postscript file, just to name a few possibilities) and, optionally, the URL (universal resource locator) of the handler that is adapted to display the form on the client 112. For example, in FIG. 4, the form 128-2 (Form 1), which is in Postscript ("Post") format, requires a Postscript handler whose URL is given by the CF3_ref entry of the registry 134. The handler information is sometimes optional as it could be implied by the format associated with a particular form 128-i. This is because a Java-enabled browser 166-1 can be configured to fetch from the network a handler based on the format of a particular form or document if a compatible handler is not already resident on the client where the form or document is to be processed. Note that the file format does not necessary mean that the file handler will be able to display all of the fields 312-i that compose the form. This is because individual fields 312-i can be in different formats—e.g., different graphical formats—from the form in which they are embedded. This is consistent with the design of Java documents, where an HTML compound document can have embedded flat files with attributes that can only be displayed by handlers that are referenced by the flat file or which are implied by the attributes of the flat file.

In the preferred embodiment, one of the forms 128 is a master file 128-1 ("Master"), which a client 112 automatically displays 112 upon receiving a workflow courier document 118. This is possible as the master file 128-1 is always formatted as an HTML/Java document, which can be displayed by each of the clients 112. As with any top-level Java compound document, the master file 128-1 serves as a common starting document/form for each of the stages.

Each of the fields 312-ij of a form 128-i includes a datum or data 320 and a pointer 322 to a code fragment reference (e.g., "*CF2_ref"). A datum 320 holds information entered by an actor or one of the programs 130 in the field. This information is retained as the workflow is being executed. Note that, as FIG. 4 shows the workflow courier 118-1 before any actions have been taken, the data 320 are all blank.

A CF_ref pointer 322-i stores the address of an entry in the registry 134 that contains a pointer to a program 130 that is associated with the corresponding field 312-i (i.e., each field 312 is indirectly associated with a program via the registry 134). As mentioned above, a program 130 might be a handler for data stored in a particular field, a mini-expert system to assist an actor in filling in a field or a larger-scope expert system that is familiar with how the workflow should be executed. The actual executable program 130 could be stored within the workflow courier in the program cache 130 or remotely from the client 112 or server 110 in which the workflow courier 118 is resident. For example, the program cache 130 includes four locally-stored programs, progs 1, 2, 4, 6 corresponding respectively to programs 130-1a to 130a-1d, which 30 were initially stored on the server 110-1. The respective URLs of these programs, *prog1, 2, 4, 6 are stored in the registry 134. The registry 134 also stores the URLs of remotely stored programs, such as the program 130-2a, which are not downloaded to the client 112 from their respective servers 110 as a part of the workflow courier 118. When, in the course of executing stages of the workflow, a remote program is needed, it is downloaded and then stored in the program cache 130 with the other programs. For example, in FIG. 4, program 3 (130-2a) has been download to the program cache 130. When a remotely-stored program is downloaded, the program's pointer in the registry 134 is reset to downloaded program as shown by the line 135. This indirection provided by the registry 134 is useful as many of the fields are likely to require the same program (e.g., the fields 312-1a to 312-1c and 312-2d all reference program 1) and storing multiple local pointers 322 to the one registry entry that stores the full URL for a shared program is far more efficient than storing identical program URLs in each CF_ref pointer 322.

The workflow courier 118 also includes an accumulated state database 132, which is updated by the program elements 130 of the workflow courier 118-1 as the stages of the workflow are completed. This enables the workflow courier 118 to retain its state as it is transmitted to and asynchronously processed by other clients, such as the clients 112-2 and 112-3 (FIG. 2). Then, as it is executed at each client, the workflow courier 118 consults its accumulated state 132 before determining which stage is to be executed.

Workflow Courier Processing Method

Figure 5:
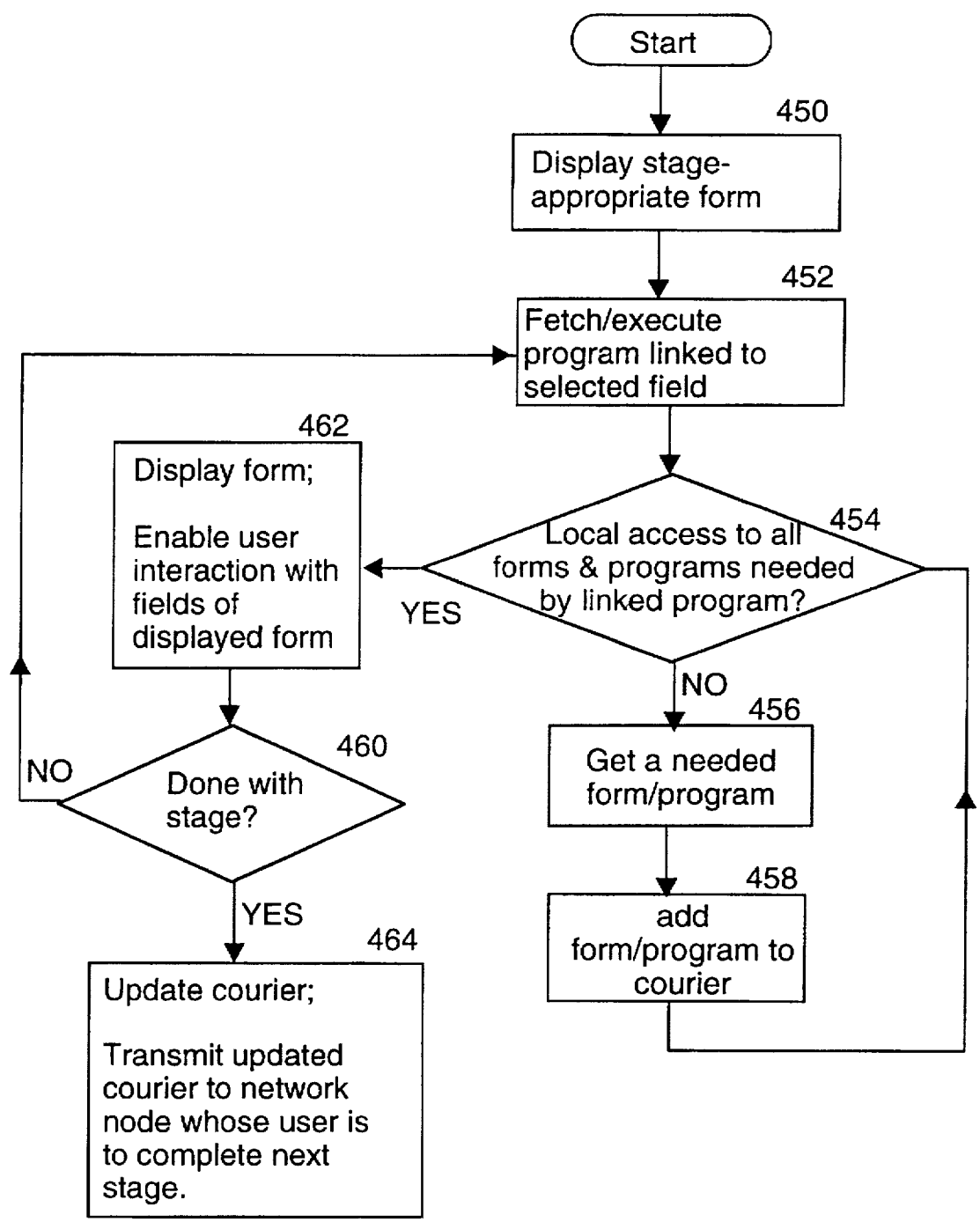
FIG. 5 is a flow chart of the method by which a networked client completes one stage of a workflow using the workflow courier of the present invention.

Referring to FIG. 5, there is shown a flowchart of the method by which the present invention executes one stage of a workflow. The steps of this flowchart begin after the workflow courier 118 has been transmitted to a client 112 whose associated user is authorized to perform one stage of the workflow. As the first step, the browser 166 running on the client 112 displays a stage-appropriate form 128-i, from which the user can select from among a number of basic options or fields to fill-in (450). For example, this form could be a master form 128-1 (FIG. 4) common to all stages that includes three options, "Go", "Wait" and "Cancel", which an actor can select to indicate, respectively, his intention to execute the appropriate stage, perform the stage later, or refuse to perform the stage.

Once the actor selects a field or option from the stage-appropriate form, the browser 166 fetches and executes the program linked to the selected field (452). Note that the linked program could be stored on the client 112 in the program cache 130 or on some other network node. For example, if the actor selects the "Go" option from the master form 128-1 (FIG. 4), which has a linked code fragment reference pointer value of "*CF1_ref" (FIG. 4), the browser 166-1 will follow the pointer "*CF1_ref" to the "CF1_ref" entry in the registry 134-1, which, in turn, addresses "prog1" (the workflow expert 310-1a) in the local program cache 130. The browser 166-1 will then load and execute the workflow expert 310-1a.

Once a program is executing, that program determines, based on the rules it encapsulates and the accumulated state 132, the forms 128 and programs 130 it needs access to accomplish its task. The executing program then determines whether it has local access to all of those necessary forms 128 and programs 130. If not (454-NO), the executing program causes the browser 166 to pull in from the network all of the needed documents/forms and programs that are not locally available (456) and add those programs to the program cache 130 or the forms database 128 in the workflow courier 118 (458). When all of the necessary forms and programs are locally available (454-YES), the executing program displays the necessary forms 128 and enables the actor to interact with (i.e., select and fill-in) appropriate fields of those forms under control of the program(s) linked to those fields (462). These linked programs can provide guidance as the actor fills in a respective field, check the information entered by an actor or determine, based on information entered by an actor, further necessary actions. For example, a linked program could advise the requestor in the travel request workflow to enter their desired travel dates in the MM/DD/YY format and also check all values entered by the requestor for conformity to that standard.

After the user interaction, the executing program, or one of the linked programs, updates the workflow courier 11 8 and the displayed forms to reflect the latest user interaction and determines, again based on rules, whether the actor has completed the stage (460). If not (460-NO), the executing program once again fetches and executes the program 130 linked to fields (if any) selected by the user in the most recent interaction (452). If the executing program determines that the actor has completed the stage (460-YES), the executing program updates the accumulated state 132 to show that the current stage has been completed and transmits the updated workflow courier 118 to a client with a user who is the actor authorized to perform the next stage of the workflow (464).

Prior to transmitting the updated workflow courier, as part of the state updating step, the local program cache 130 in the workflow courier is purged (A) of all programs that may not be needed by the next stage, or (B) all programs not designated as being a permanent part of the workflow courier, depending on the implementation.

In the preferred embodiment the identity of the authorized actor for the next stage is determined based, again, on rules. The rules could describe a static process for determining the next actor (e.g. "when done with stage 1, send the updated workflow courier to requesters manager: Bill Smith @###.com"). However, the workflow courier of the present invention is also able to resolve roles dynamically to an actor based on arbitrary criteria, which are defined in the rules).

For example, in the travel request example, assume the following:

(1) the workflow expert has a rule that says "once stage 1 is completed, forward the travel request to the requestor's manager for approval" (i.e., send the updated travel request to an actor whose actor type is "requestor manager");

(2) the workflow expert knows that the requestor has employee number 1, is an employee in department 1 and uses node 112-2; and (3) organizational information can be obtained from the user database 114-2, which is coupled to the database server 110-2 (see FIG. 2).

Based on this information, the workflow expert would send the database server 110-2 a message asking that server 110-2 to query the user database 114-2 to determine the identity of employee 1's manager. Upon receiving the answer (e.g., "employee number 2 @ network node 112-2"), the workflow expert would transmit the updated workflow courier 118-1" (FIG. 2) to that node, where the manager would be able to review the travel request. Of course, based on other rules, the meaning of the term "requestor's manager" could vary. For example, in the case of a local travel request, that term might mean the requestor's first level manager whereas, for an international travel request, the "requestor's manager" might be the second level manager. Thus, the workflow courier is able to resolve roles at runtime.

Due to the intelligence embodied in the programs 130, other factors (i.e., other actor selection criteria) can be considered by the top-level program when forwarding updated workflow couriers to other actors in the workflow after stages have been completed. For example, in a help desk application, calls received at one help desk after closing time could be relayed to a qualified individual at another office with later hours or in a different time zone. This information could be easily obtained from directories accessible to the workflow programs 130. Alternatively, the nodes of the authorized actors could be hard-coded in the workflow programs 130. This arrangement might be appropriate for simple workflows that are always performed within a brief time frame or where all of the actors use clients connected to a single LAN.

Figure 6:
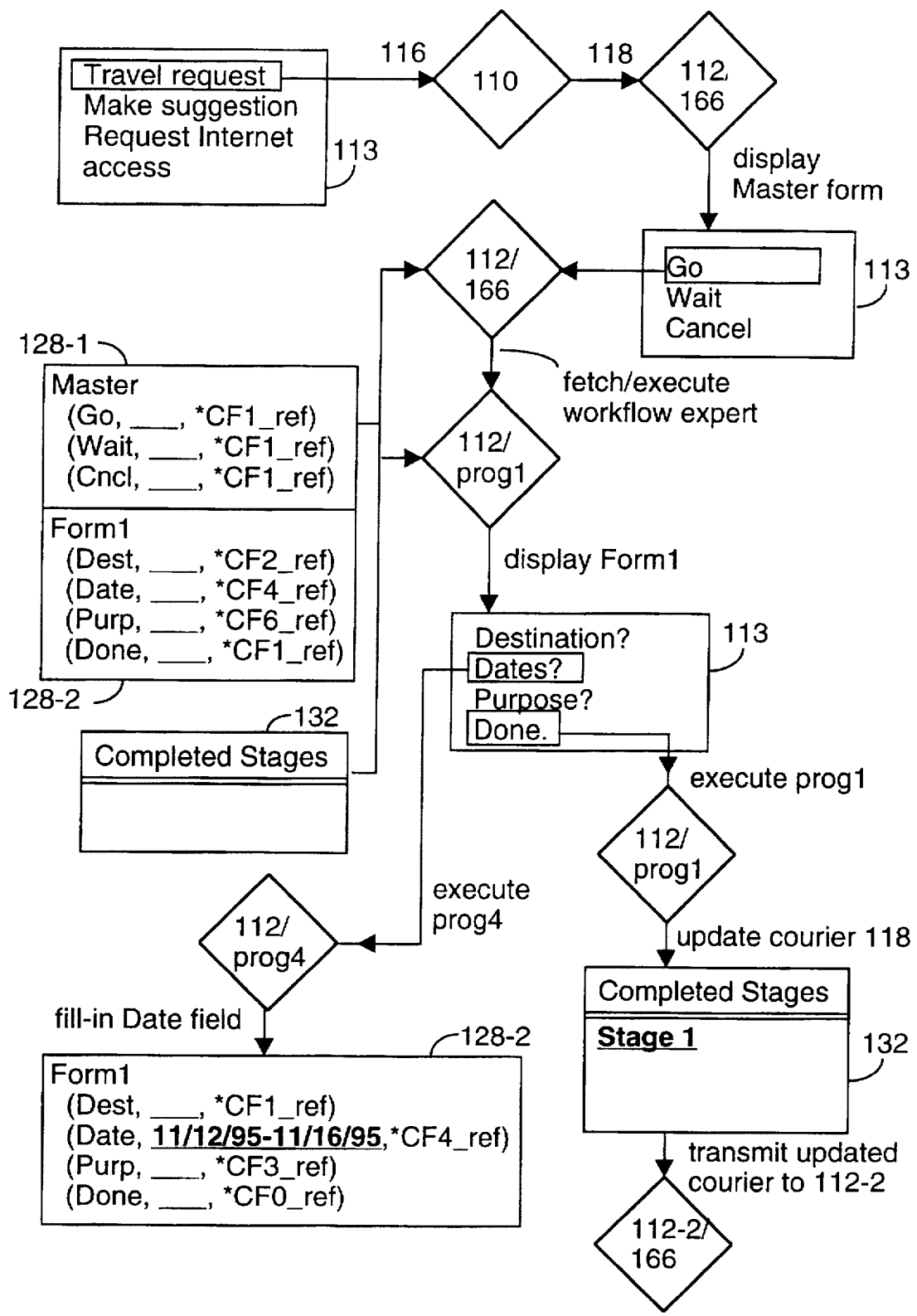
FIG. 6 illustrates an example of the execution of one stage of a workflow according to the method of the present invention.

Having described the steps of the present invention, a concrete example showing the application of these steps to the travel request workflow is now described in reference to FIG. 6.

Referring to FIG. 6, there is shown a flow diagram illustrating the interaction of the data structures of the workflow courier 118 and the network nodes 110, 112 that perform the some of the stages of the workflow 140-1 (i.e., the travel request workflow). In this diagram, data structures and display screens are shown as rectangular boxes and the programs that operate on the data or display the screens are shown as diamonds. In many cases, the network node ID and the program responsible for the illustrated step are shown as the pair host/program; e.g., "112/166" inside a diamond indicates that the step is performed by the browser 166 running on the network client 112. Specifically, FIG. 6 illustrates the execution of the first stage of the workflow 140-1 (i.e., the travel request workflow), where a master document ("Master") offers three options ("Go", "Wait" and "Cancel") and where another form ("Form1") requires a user to fill in their destination ("Dest", travel dates "Date", purpose for the travel ("Purp") and then, when they are finished, click on "Done."

To initiate the workflow 140-1, the requestor selects the travel request workflow option displayed on the display/input device 113-1 that is coupled to the client 112-1. As a result, the client 112-1 sends the travel request message 116 to the server 110-1, which builds and then transmits to the client 112-1 the workflow courier 118-1, which encompasses all of the forms and program references needed for the workflow 140-1 to be completed. Upon receiving the workflow courier 118-1, the browser 166 running on the client 112 displays the master form, which in HTML format, specifies three user-selectable options, "Go," which a user selects to proceed with the appropriate stage, "Wait," which a user selects to store the workflow courier 118 for later processing and "Cancel," which, when selected, discontinues the workflow. In this example, the user selects "Go" and, as a result, the browser fetches and executes the workflow expert (prog1), which is linked to the "Go" field via the *CF1_ref pointer to the CF1_ref entry in the registry 134.

Program 130-1a (prog1), the workflow expert for the workflow 140-1, encompasses all knowledge about the order in which the stages of the workflow are to be executed and what forms and fields are to be completed in each stage. Based on the fact that the accumulated state 132 is empty, the workflow expert 130-1a determines that stage 1 needs to be completed and that this requires that Form 1 be filled out by the actor using the client 112-1. Consequently, the workflow expert 130-1a displays Form 1 on the display 113-1, with the assistance of the prog3 (a Postscript handler linked to the form 1). This form offers four selectable options, "Destination?," asking the requestor to fill in their travel destination, "Dates?," where the requester enters their travel dates, "Purpose?," which asks the requester to provide the purpose of the requested trip and "Done," which the requestor selects when they believe they have completed the form.

In the present example, the user first selects the "Dates?" field from the displayed Form 1. As a result, the workflow expert 130-a1 causes the browser 166 to fetch the program (i.e., prog4) linked to the date field. As mentioned above, this linked program might advise the requestor to enter their desired travel dates in the month/date/year, or MM/DD/YY, format and check all values entered by the requestor for conformity to that standard. Once prog4 determines the user has entered a conforming date, it enters that information in the appropriate field and format in the form 128-2 and returns control to the workflow expert.

Assuming that the user has correctly filled in the appropriate forms, the user might then select the "Done." option. In the example shown in FIG. 6, this option is linked to the workflow expert (prog1) because, when this option is selected, the workflow expert (prog1) must determine whether, according to its encapsulated rules whether the stage has been completed by the requester. Assuming that the user has correctly completed the first stage, the workflow expert will update the accumulated state 132 to show that the first stage has been completed, determining the network node of the actor authorized to perform the next stage of the workflow and then transmit the updated courier to the that node. In this example, this means that the workflow expert will ask the browser 166 to transmit the updated courier to the client 112-2, which is the network node associated with the requestor's manager.

In one alternative embodiment of the present invention, instead of presenting images to a standalone Web browser, the various programs 130 can be configured to provide data and forms as OLE objects so they can be used with applications and in any environments that support OLE object sharing (note: an OLE application can share data with and be embedded in other OLE applications, so that, for example, a user can insert a spreadsheet inside a word processor document and can edit the spreadsheet using the features of the spreadsheet program from within the embedding document by simply moving the cursor inside the spreadsheet window). In such a configuration, universally executable programs encapsulating business/workflow rules would be able to provide data for many common word processing, spreadsheet and database applications. In a similar vein, the programs 130 can be modified to support any variety of application program interfaces that might be the standard in the network environment in which the workflow is being performed. Of course, in every situation, all of the networked computers on which the workflow stages are to be performed must be able to process and execute the programs that are embedded and/or referenced in the workflow courier.

Figure 7:
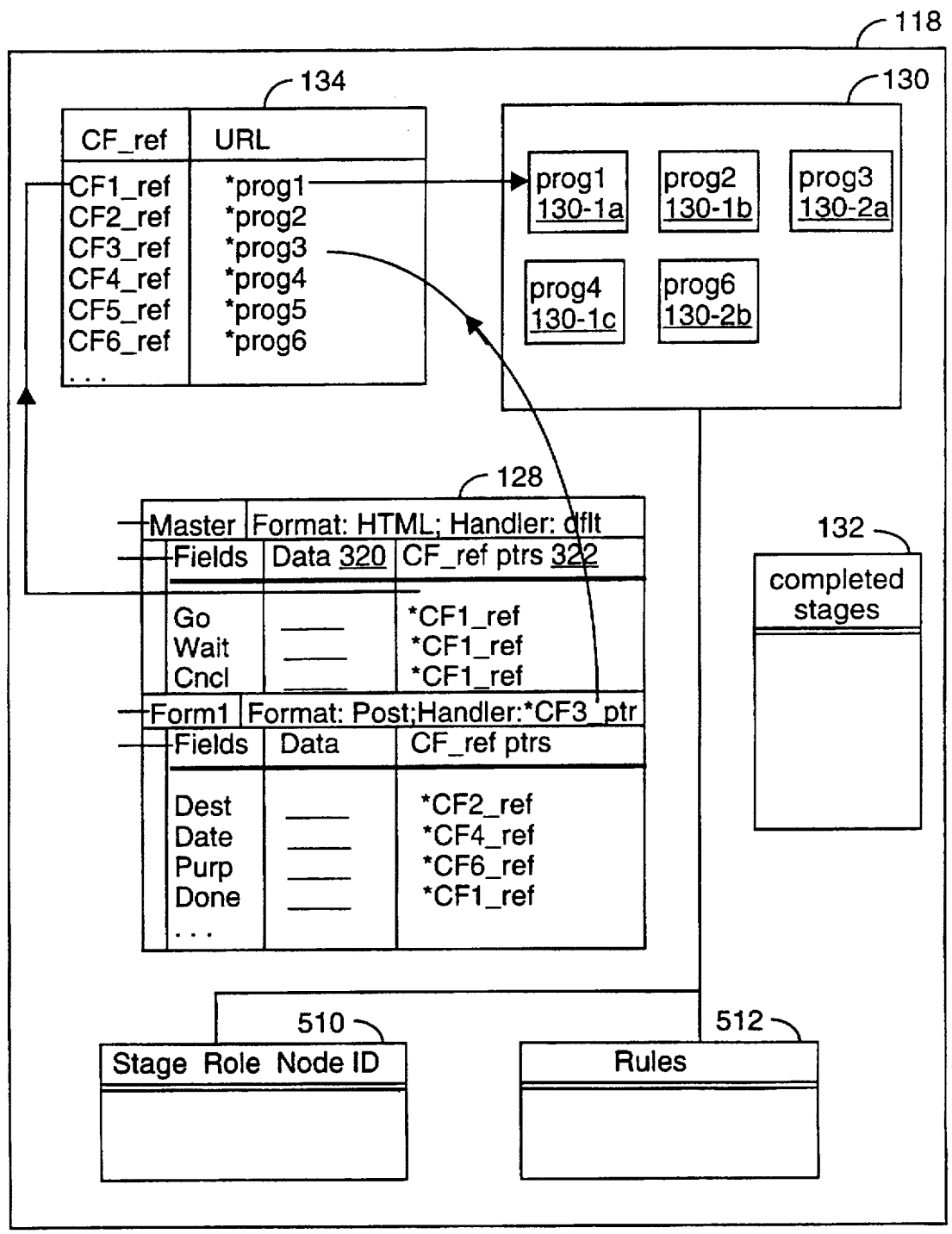
FIG. 7 illustrates some alternative embodiments of the workflow courier of the present invention.

In another alternative embodiment, shown in FIG. 7, the workflow courier can be configured with a route 510 and/or a rules 512 databases. The route database 510 contains an ordered list of each of the stages and the nodes of actors authorized to perform those stages. The various workflow experts 130 would access the route 510 to determine the identity of the next actor to receive the updated workflow courier 118. This approach does lack some of the flexibility of the preferred embodiment, but it also is less complex to implement and is appropriate for workflows that are very straightforward. In this alternative embodiment, additional flexibility could be provided by describing the roles of the authorized actors, where appropriate, and provide the URL of an employee database where the node address of an authorized actor meeting that role can be found. For example, instead of specifying the route as:

| Stage 1 | employee num 321 | node 112-1 |
| Stage 2 | employee num 447 | node 112-2 |

The route could be specified as:

| Stage 1 | employee num 321 | node 112-1 |
| Stage 2 | requestor manager | dir. 114-2 @ node 110-2. |

The node information for the requester manager indicates that the node and identity of the requestor's manager can be found in the directory 114-2, which is accessed through the database server 110-2. The rules database 512 is a copy of the workflow rules 146 that pertain to the initiated workflow. The programs 130 would process these rules as needed.

In yet another alternative embodiment, an abstract index (e.g. an index built around general concepts) in a database 114 is used to locate a list of specific names, each of which is bound to a specific object (e.g., a workflow 140) that contains the rules, data structures, code references, etc., that pertain to one aspect of the indexed concept. This list of names is returned to a user, who can then select one of the names, or a link to one of the names, at which point the reference is accessed and loaded. For example, the user could initiate a workflow by first submitting a very general query to a database server 110, such as "I'm interested in fishing". The server then scans its database 114 for fishing-related workflows and returns a document to the user listing the various options, for example:

1) book a fishing vacation,
2) order fishing tackle,
3) buy a fishing boat,
4) buy fishing clothes, etc.

Based on the user's selection of one or more of these options, the client 110 submits appropriate workflow request messages 116 and the server 110-2 builds and transmits the workflow courier 118 as described above.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a network that includes at least one server and at least one client coupled to said network, a computer-readable memory associated with each of at least a subset of said at least one server and said at least one client, each said computer-readable memory being configured to direct an associated member of said subset to execute at least one stage of a plurality of stages that compose a workflow and to cooperate with other members of said subset so that all of said stages of said workflow are executed by said members, one of said computer-readable memories comprising:

data representing manifestations of a set of actions to be completed through the execution of at least one of said plurality of stages, each of said stages being executable by a respective authorized actor associated with one of said members;

state data indicating executed stages in said workflow;

a registry containing at least one code fragment reference that points to an executable code fragment stored on said network, each of said executable code fragments being executable on any of said members; such that, when being executed on one of said members, an appropriate subset of said executable code fragments directs said one member to perform workflow tasks associated with an appropriate stage of said workflow based on actions of said actor, said state data and said data representing manifestations and then updates said manifestations and said state data to indicate execution of said appropriate stage; and a reference to or a representation of a set of workflow rules defining how said stages are to be executed.

2. The memory of claim 1, wherein said executable code fragments are written in a platform-independent computer language, each of said members further comprising a browser that is configured to load and run said executable code fragments.

3. The memory of claim 2, wherein programs written in said platform-independent computer language can be downloaded to, installed on and executed by a computer configured with said browser in a way that is substantially certain not to compromise integrity and security of said computer.

4. The memory of claim 3, wherein said platform-independent computer language is Java.

5. The memory of claim 2, wherein, based on said updated manifestations, said updated state data, said actions and said workflow rules, said subset of executable code fragments determines a subsequent stage of said workflow to be executed and an actor type authorized to execute said subsequent stage.

6. The memory of claim 5, further comprising:

an actor index comprising at least one network reference to respective actor directories, wherein an actor directory includes addresses of network nodes associated with authorized actors;

such that, following said determination of said subsequent stage of said workflow to be executed and said actor type authorized to execute said subsequent stage, said executing subset directs said one member to access said referenced actor directories and select from said actor directories as an appropriate member for the execution of said subsequent stage a network node of an actor represented therein as having said actor type; said executing subset thereafter directing said one member to communicate to said appropriate member said rules, said code references, said updated manifestations, and said updated state data so that said memory of said appropriate member can be configured to direct said appropriate member to execute said subsequent stage.

7. The memory of claim 2, further comprising:

a route defining a sequence of said stages and associating with each stage in said sequence a network node identifier of one of said members associated with an actor authorized to execute that stage;

wherein, following execution of one of said stages and based on said updated state data and said route, said subset of executable code fragments determines a subsequent stage to be executed and directs said one member to communicate to said actor authorized to execute said stage said route, said code references, said updated manifestations and said updated state data so that said memory of said appropriate member can be configured to direct said appropriate member to execute said subsequent stage.

8. The memory of claim 2, wherein said data representing said manifestations comprise a set of forms to be completed through the execution of said plurality of stages that compose said workflow; said executing subset of code fragments directing said member to display appropriate ones of said set of forms and enable actor interaction with said forms.

9. The memory of claim 8, wherein said set of forms includes a master form providing a set of actor-selectable options common to all of said plurality of stages, said executing subset of code fragments directing said member to display said master form.

10. The memory of claim 9, wherein said workflow tasks include one or more of displaying said forms, determining from said state data a pending stage to be executed, guiding an actor through execution of said pending stage based on said workflow rules and updating said forms and said state data to reflect completion of said pending stage.

11. The memory of claim 10, wherein said form comprises a collection of fields, each of said fields containing field data and at least zero pointers to respective registry entries, each of which stores at least one code fragment reference.

12. The memory of claim 11, wherein said code fragment reference comprises an address of an executable code fragment, said address being selected from a local address when said executable code fragment is stored within said memory or a remote address when said executable code fragment is stored on a network node other than said client.

13. The memory of claim 12, wherein, when a user selects a field of a displayed form, said executing subset directs said member to execute said code fragments that are linked to said field via an associated entry in said registry, said code fragments being configured to perform field-oriented tasks including enabling user interaction with said field, instructing a user on how to complete said field based on pre-stored rules associated with said field and verifying legality of entries made by said user.

14. The memory of claim 1, wherein said code fragments incorporate said set of workflow rules defining how said stages are to be executed.

15. The memory of claim 1, further comprising a rules database incorporating said set of workflow rules defining how said stages are to be executed.

16. A computer system for asynchronously executing steps of a sequential process on a network that includes at least one server and at least one client coupled to said network, said servers and said clients each including a processor and a memory and having a unique network ID, said computer system comprising:

a requestor that is executable on a client's processor, said requestor being configured to control messages issued by said client on said network, said messages including a request message instructing a particular one of said servers to transmit to said client a workflow courier requested by a user of said client;

a provider that is executable on a server's processor, said provider being configured to be responsive to said messages directed to said server, said provider being configured to respond to said request message by causing said server to transmit to said client said workflow courier;

said workflow courier comprising:
 a set of forms to be completed through the execution of a plurality of stages that compose a workflow, each of said stages being executable by a respective actor;
 state data indicating executed stages in said workflow; and
 a registry containing at least one code fragment reference, each of which points to an executable code fragment;

such that, upon receiving said workflow courier over said network, said client displays one of said forms and, based on user interaction with said form and other displayed forms, selectably loads and runs a set of referenced code fragments that are configured, when running, to perform one or more of a number of workflow tasks, including displaying said forms, determining from said state data a pending stage to be executed, guiding an actor through execution of said pending stage based on workflow rules and updating said forms and said state data in said workflow courier to reflect completion of said pending stage.

17. The computer system of claim 16, wherein said set of forms includes a master form providing a common set of selectable options and wherein said master form is displayed by said client upon receiving said workflow courier.

18. The computer system of claim 17, wherein said executable code fragments are written in a platform-independent computer language, said clients further comprising a browser that is configured to load and run said executable code fragments.

19. The computer system of claim 18 wherein said platform-independent computer language is Java.

20. The computer system of claim 19, wherein said provider is also configured to respond to broad user workflow requests issued from said requestor by providing said requestor with a plurality of workflow options that satisfy search terms included in said broad user workflow request, each of said workflow options being linked to a specific workflow so that, when said user selects one of said plurality of workflow options, said requestor is configured to issue on said network a workflow request for said linked workflow.

21. A computer system for executing steps of a sequential process on a network that includes at least one server and at least one client coupled to said network, said servers and said clients each including a processor and a memory and having a unique network ID, said computer system comprising:

a requester that is executable on a client's processor, said requestor being configured to control messages issued by said client on said network, said messages including a request message instructing a particular one of said servers to transmit to an appropriate network node a workflow courier corresponding to a workflow requested by a user of said client;

a provider that is executable on a server's processor, said provider being configured to be responsive to said messages directed to said server, said provider being configured to respond to said request message by causing said server to transmit to said appropriate network node said workflow courier;

said workflow courier comprising:
 a set of data representing manifestations of a set of actions to be completed through the execution of at least one of said plurality of stages, each of said stages being executable by a respective authorized actor associated with a network node;
 state data indicating executed stages in said workflow; and
 a registry containing at least one code fragment reference, each of which points to an executable code fragment, said executable code fragments being written in a platform-independent computer language so that said code fragments can be executed on any of said network nodes, an appropriate subset of said executable code fragments directing said appropriate node in receipt of said workflow courier to perform workflow tasks associated with an appropriate stage of said workflow based in part on actions of said actor, said state data and said set of data representing manifestations, said workflow tasks including updating said set of data representing manifestations and said state data where appropriate.

22. The computer system of claim 21, wherein said clients further comprise a browser that is configured to load and run said executable code fragments.

23. The computer system of claim 22, wherein programs written in said platform-independent computer language can be downloaded to, installed on and executed by a computer configured with said browser in a way that is substantially certain not to compromise integrity and security of said computer.

24. The computer system of claim 23 wherein said platform-independent computer language is Java.

25. The computer system of claim 24, wherein said provider is also configured to respond to broad user workflow requests issued from said requester by providing said requestor with a plurality of workflow options that satisfy search terms included in said broad user workflow request, each of said workflow options being linked to a specific workflow so that, when said user selects one of said plurality of workflow options, said requestor is configured to issue on said network a workflow request for said linked workflow.

26. The computer system of claim 22, wherein, based on said updated manifestations, said updated state data, said actions and said workflow rules, said subset of executable code fragments determines a subsequent stage of said workflow to be executed and an actor type authorized to execute said subsequent stage.

27. The computer system of claim 26, further comprising:
an actor index comprising at least one network reference to respective actor directories, wherein an actor directory includes addresses of network nodes associated with authorized actors;
such that, following said determination of said subsequent stage of said workflow to be executed and said actor type authorized to execute said subsequent stage, said executing subset directs said one member to access said referenced actor directories and select from said actor directories as an appropriate member for the execution of said subsequent stage a network node of an actor represented therein as having said actor type; said executing subset thereafter directing said one member to communicate to said appropriate member said rules, said code references, said updated manifestations, and said updated state data so that said memory of said appropriate member can be configured to direct said appropriate member to execute said subsequent stage.

28. The computer system of claim 21, wherein said code fragments incorporate a set of workflow rules defining how said stages are to be executed.

29. The computer system of claim 21, wherein said workflow courier further comprises a rules database incorporating a set of workflow rules defining how said stages are to be executed.

30. A computer-implemented method for performing workflow on a network comprising the steps of:
(1) issuing a workflow request on said network;
(2) in response to said workflow request, a server building a workflow courier, said workflow courier including:
  (a) a set of forms to be completed through the execution of a plurality of stages that compose said workflow, each of said stages being executable by a respective actor;
  (b) state data indicating executed stages in said workflow; and
  (c) a registry containing at least one code fragment reference, each of which points to an executable code fragment;
(3) said server transmitting said workflow courier to a network node associated with an actor authorized to perform an appropriate stage of said workflow;
(4) upon receiving said workflow courier over said network, said network node executing said workflow courier so that said actor performs said appropriate stage under control of said executing workflow courier, said workflow courier ensuring that said actor performs said stage according to rules associated with said workflow and said stage;
(5) upon completion of said appropriate stage, said workflow courier updating itself to reflect status of said workflow upon completion of said appropriate stage;
(6) after updating itself, said workflow courier determining whether said workflow is complete; and
(7) after determining that said workflow is not complete, said workflow courier determining another appropriate stage of said workflow to be completed and transmitting said workflow courier to a next network node associated with an actor authorized to perform said another appropriate stage.

31. The computer-implemented method of claim 30, wherein said set of forms includes a master form providing a common set of selectable options and wherein said master form is displayed by said client upon receiving said workflow courier.

32. The computer-implemented method of claim 31, wherein said executable code fragments are written in a platform-independent computer language, said clients further comprising a browser that is configured to load and run said executable code fragments.

33. The computer-implemented method of claim 32, wherein said platform-independent computer language is Java.

34. The computer-implemented method of claim 30, further comprising the step of:
upon determining that said workflow is complete, said workflow courier causing said network node to transmit final notification of completion of said workflow to said server.

35. The computer-implemented method of claim 30, wherein said step of executing said workflow courier comprises:
displaying said forms;
based on user interaction with said forms, selectably loading and running a set of referenced code fragments;
said referenced code fragments, when running, performing one or more of a number of workflow tasks comprising:
  displaying said forms,
  determining from said state data a pending stage to be executed;
  guiding an actor through execution of said pending stage based on workflow rules;
  updating said forms and said state data in said workflow courier to reflect completion of said pending stage; and
  forwarding updated workflow courier to an appropriate network node for execution of a subsequent stage by another actor.

36. The computer-implemented method of claim 30, wherein said step of executing said workflow courier comprises:
(1) displaying zero or more forms that are appropriate for said stage being performed;
(2) enabling user interaction with fields of said forms, said user interaction including selecting a field of said forms to complete;
(3) fetching and executing zero or more linked programs linked to said field selected by said user;
(4) said linked programs determining whether there is local access on said network node to all programs and forms needed by said linked programs;
(5) when said needed programs and forms are not locally available:
  fetching said needed programs and forms from said network; and
  adding said fetched programs and forms to said workflow courier;
(6) when said needed programs and forms are locally available:
  said linked programs displaying said needed forms and executing said needed programs where appropriate; and
  enabling user interaction with fields of said needed forms according to said rules;
(7) determining whether, as a result of said user interaction and in light of said rules, said stage has been completed; and (8) upon determining that said stage has not been completed, repeating steps of said method from step (4) through step (8).

37. A computer-implemented method for performing workflow on a network comprising the steps of:

(1) issuing a workflow request on said network;

(2) in response to said workflow request, a server building a workflow courier, said workflow courier comprising:

(a) a set of data representing manifestations of a set of actions to be completed through the execution of at least one of a plurality of stages that compose said workflow, each of said stages being executable by a respective actor;

(b) state data indicating executed stages in said workflow; and (d) a registry containing at least one code fragment reference, each of which points to an executable code fragment, each of said executable code fragments being executable on any of said nodes without compromising integrity and security of said any node;

(3) said server transmitting said workflow courier to a selected network node associated with an actor authorized to perform, in accordance with said workflow courier, an appropriate stage of said workflow.

38. The computer-implemented method of claim 37, further comprising the steps of:

(1) upon receiving said workflow courier over said network, said selected network node executing said workflow courier so that said actor performs said appropriate stage under control of said executing workflow courier, said workflow courier ensuring that said actor performs said stage according to said set of data representing manifestations, said state data and workflow rules that define how said stages are to be executed; and (2) upon completion of said appropriate stage, said workflow courier updating itself to reflect status of said workflow upon completion of said appropriate stage.

39. The computer-implemented method of claim 37, wherein said step of executing said workflow courier comprises:

displaying at least a subset of said set of data representing manifestations;

based on user interaction with said displayed subset, selectably loading and running a set of referenced code fragments;

said referenced code fragments, when running, performing one or more of a number of workflow tasks comprising:

displaying said set of data representing manifestations of a set of actions, determining from said state data a pending stage to be executed;

guiding an actor through execution of said pending stage based on workflow rules;

updating said set of data representing manifestations of a set of actions and said state data in said workflow courier to reflect completion of said pending stage; and forwarding updated workflow courier to an appropriate network node for execution of a subsequent stage by another actor.

40. The computer-implemented method of claim 37, wherein said step of executing said workflow courier comprises:

(1) displaying at least a subset of said set of data representing manifestations that are appropriate for said stage being performed;

(2) enabling user interaction with fields of said displayed subset, said user interaction including selecting a field of said displayed subset to complete;

(3) fetching and executing zero or more linked programs linked to said field selected by said user;

(4) said linked programs determining whether there is local access on said network node to all programs and sets of data representing manifestations of a set of workflow actions needed by said linked programs;

(5) when said needed programs and sets of data representing manifestations are not locally available:
fetching said needed programs and said sets of data representing manifestations from said network; and
adding said fetched programs and said sets of data representing manifestations to said workflow courier;

(6) when said needed programs and said sets of data representing manifestations are locally available:
said linked programs displaying said needed sets of data representing manifestations and executing said needed programs where appropriate; and
enabling user interaction with fields of said needed sets according to said rules;

(7) determining whether, as a result of said user interaction and in light of said rules, said stage has been completed; and (8) upon determining that said stage has not been completed, repeating steps of said method from step (4) through step (8).

41. The computer-implemented method of claim 37, wherein said code fragments incorporate said workflow rules.

42. The computer-implemented method of claim 37, wherein said workflow courier further comprises a rules database incorporating said workflow rules.

* * * * *